(12) United States Patent
Nilsson et al.

(10) Patent No.: US 12,483,303 B2
(45) Date of Patent: Nov. 25, 2025

(54) SUBBAND PRECODING TECHNIQUE

(71) Applicant: Telefonaktiebolaget LM Ericsson (publ), Stockholm (SE)

(72) Inventors: Andreas Nilsson, Gothenburg (SE); Xinlin Zhang, Västra Frölunda (SE); Sven Jacobsson, Västra Frölunda (SE); Chandan Pradhan, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/687,725

(22) PCT Filed: Sep. 2, 2022

(86) PCT No.: PCT/EP2022/074505
§ 371 (c)(1),
(2) Date: Feb. 28, 2024

(87) PCT Pub. No.: WO2023/031424
PCT Pub. Date: Mar. 9, 2023

(65) Prior Publication Data
US 2024/0421864 A1    Dec. 19, 2024

Related U.S. Application Data

(60) Provisional application No. 63/240,551, filed on Sep. 3, 2021.

(51) Int. Cl.
*H04B 7/0456* (2017.01)

(52) U.S. Cl.
CPC .................................. *H04B 7/0456* (2013.01)

(58) Field of Classification Search
CPC .. H04B 7/0456; H04B 7/0639; H04B 7/0617; H04B 7/063; H04B 7/0478; H04B 7/065;
(Continued)

(56) References Cited

U.S. PATENT DOCUMENTS

| 11,394,434 B2 * | 7/2022 | Huang | H04W 8/24 |
| 2010/0091905 A1 * | 4/2010 | Khan | H04L 5/006 |
|  |  |  | 375/296 |

(Continued)

FOREIGN PATENT DOCUMENTS

WO    2017188736 A2    11/2017

OTHER PUBLICATIONS

3rd Generation Partnership Project, "3rd Generation Partnership Project; Technical Specification Group Radio Access Network; NR; Radio Resource Control (RRC) protocol specification (Release 16)", 3GPP TS 38.331 V16.5.0 (Jun. 2021), pp. 1-283.

(Continued)

*Primary Examiner* — Eva Y Puente
(74) *Attorney, Agent, or Firm* — Sonoda & Kobayashi Intellectual Property Law; Sarvajit S. Patil

(57) ABSTRACT

A technique for transmitting data on at least two subbands (602) of a radio channel (600). As to a method aspect of the technique performed by a radio device, control information indicative of at least two precoders for the at least two subbands (602) of the radio channel (600) is received. The data is transmitted on the at least two subbands (602) using the at least two precoders.

17 Claims, 8 Drawing Sheets

(58) Field of Classification Search
CPC ... H04B 7/0626; H04B 7/0632; H04W 72/23; H04W 72/21; H04W 24/10; H04W 72/0446; H04W 72/0453; H04W 24/08; H04W 88/08; H04W 88/02; H04L 1/0026; H04L 5/0048; H04L 5/0057; H04L 5/0053; H04L 5/0023; H04L 25/03343; H04L 5/0051; H04L 5/001
See application file for complete search history.

(56) References Cited

U.S. PATENT DOCUMENTS

| | | | |
|---|---|---|---|
| 2012/0113830 A1* | 5/2012 | Zhu | H04B 7/0652 370/252 |
| 2019/0319689 A1* | 10/2019 | Wu | H04B 7/066 |
| 2020/0186303 A1 | 6/2020 | Hao et al. | |
| 2021/0126681 A1* | 4/2021 | Huang | H04W 72/23 |
| 2025/0047332 A1* | 2/2025 | Yuan | H04L 5/0023 |

OTHER PUBLICATIONS

NTT DOCOMO, Inc., "Moderator's summary for discussion [RAN93e-R18Prep-02] UL enhancements", 3GPP TSG RAN #93e, Electronic Meeting, Sep. 13-17, 2021, pp. 1-30, RP-211652.

3rd Generation Partnership Project, "3rd Generation Partnership Project; Technical Specification Group Radio Access Network; NR; Physical layer procedures for data (Release 16)", 3GPP TS 38.214 V16.6.0 (Jun. 2021), pp. 1-172.

3rd Generation Partnership Project, "3rd Generation Partnership Project; Technical Specification Group Radio Access Network; NR; Multiplexing and channel coding (Release 16)", 3GPP TS 38.212 V16.6.0 (Jun. 2021), Technical Specification, pp. 1-172.

* cited by examiner

700

800

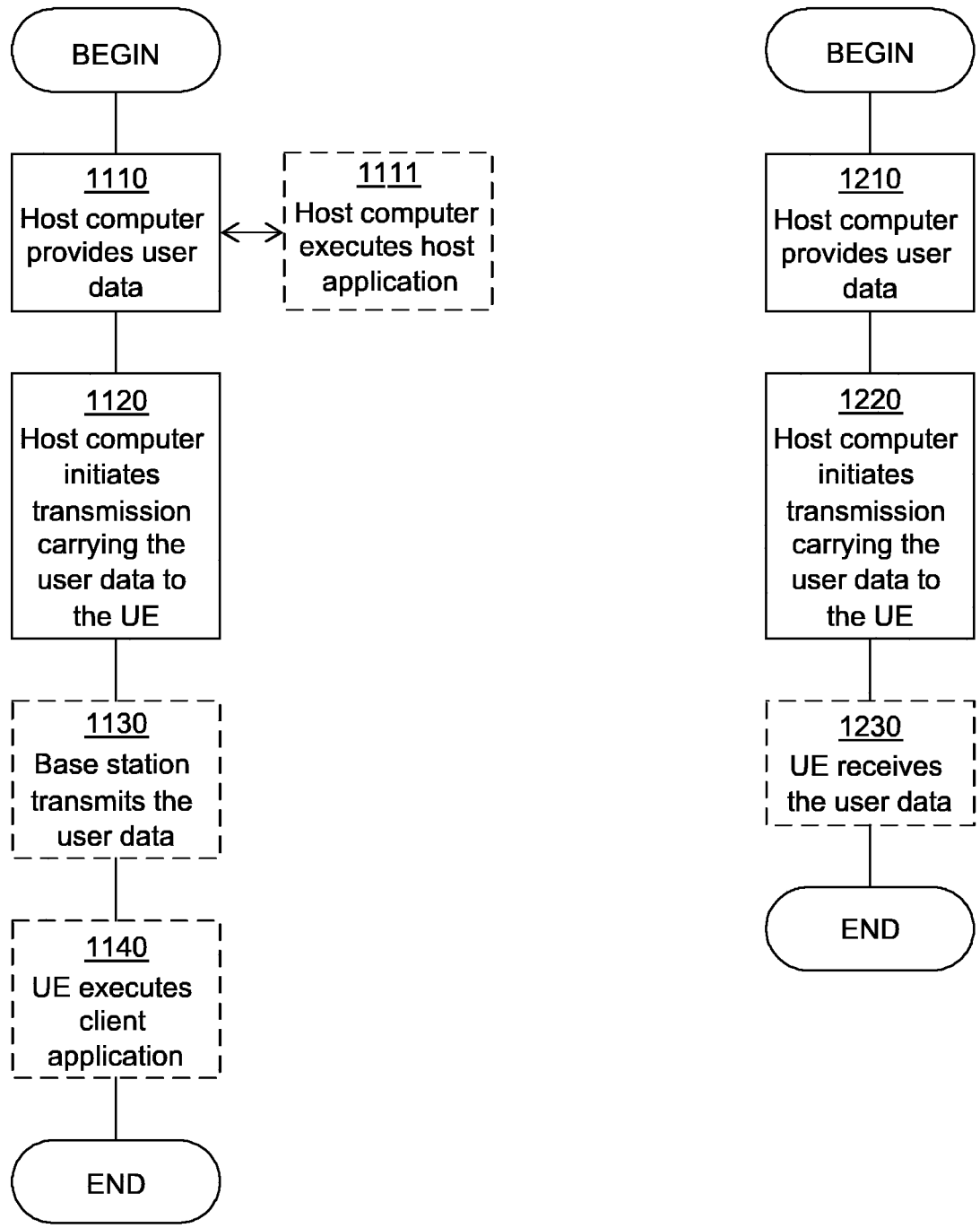

SUBBAND PRECODING TECHNIQUE

TECHNICAL FIELD

The present disclosure relates to a technique for a precoded radio communication from a radio device. More specifically, and without limitation, methods and devices are provided for transmitting and receiving data from a radio device on at least two subbands of a radio channel.

BACKGROUND

Mobile communication system comprise radio devices, also referred to as user equipments (UEs), that communicate with one or more network nodes such as a base station of a radio access network (RAN) in an uplink (UL) and a downlink (DL) according to radio access technologies (RATs) such as Long Term Evolution (LTE, also referred to as 4G) or Next Generation New Radio (5G NR) specified by the Third Generation Partnership Project (3GPP). Such RATs also enable a direct radio communication between the radio devices on sidelinks (SL).

Radio devices that comprise multiple antennas, i.e., an antenna system comprising multiple antenna elements, can perform a beamformed transmission, a beamformed reception or a multiple-input multiple-output (MIMO) radio communication by combining the multiple antennas according to a precoder, i.e., by precoding.

Existing RATs enable UL precoding at the radio device, wherein a rank and a transmitted precoding matrix indicator (TPMI) are defined for the UL precoding. That is, a precoder (and the associated rank) are applied over the bandwidth of the radio channel such as a physical uplink shared channel (PUSCH) scheduled for the UL transmission.

SUMMARY

Accordingly, there is a need for a technique that uses the channel capacity of a precoded radio channel more efficiently. An alternative or more specific object is to reduce the signaling overhead caused by a precoding technique that differentiates subbands of the radio channel.

As to a first method aspect, a method of transmitting data on at least two subbands of a radio channel is provided. The method being performed by a radio device and comprises the step of receiving control information indicative of at least two precoders for the at least two subbands of the radio channel. The method further comprises the step of transmitting the data on the at least two subbands using the at least two precoders.

The first method aspect may be implemented alone or in combination with any one of the embodiments in the list of claims.

By indicating at least two precoders for at least two subbands of the radio channel, the data transmission can use the channel capacity of the radio channel more efficiently in at least some embodiments as compared to an existing wideband precoder that applies the same precoder over the entire bandwidth of the radio channel.

Each subband may be a part of the radio channel, e.g., a part of the bandwidth of the scheduled (wideband) radio channel. The radio channel may be a physical UL shared channel (PUSCH). Using at least two precoders for at least two subband (i.e., subband precoding) may comprise applying a different precoder for each such subband.

The technique may be implemented as a precoding technique or as a framework and/or signaling for precoding. The precoding may comprise an uplink (UL) and/or sidelink (SL) subband precoding, e.g. based on a codebook (also referred to as CB-based UL or SL subband precoding).

In current 3GPP releases for 5G NR, only wideband UL precoding is supported. The technique can enable (e.g., in accordance with extended or future 3GPP releases for 5G NR) supporting subband precoding in UL or SL. At least some embodiments enable subband precoding in an overhead-efficient way, e.g., for CB-based precoding on the PUSCH.

Any one of the at least two precoders may be indicated (e.g., signaled, encoded, or represented), at least in parts, by a transmitted precoding matrix indicator (TPMI), which may also be referred to as transmitted precoding matrix index or transmit precoding matrix index or transmit precoding matrix indicator.

Embodiments of the technique can enable using at least two (i.e., different) precoders in the transmission of the data on the radio channel.

Using a precoder may also be referred to as precoding. Using the at least two precoders on the at least two subbands may also be referred to as precoding the at least two subbands (or briefly: subband precoding).

The subband precoding may or may not require indicating and/or using a different one of the precoders for each of the subbands. The subband precoding may relate to indicating and/or at least one subband-specific precoder.

Transmitting on the radio channel using the at least two precoders on the at least two subbands may enable a beamformed transmission and/or a multi-layer transmission, e.g., on each of the at least two subbands.

The radio device may comprise at least two antennas or antenna ports (e.g., on a single panel). The data may be transmitted using the at least two precoders by mapping one or more layers of the transmission to the antennas or antenna ports according to the at least two precoders. For example, each precoder may comprise or represent a matrix that (e.g., linearly) maps the one or more layers to the at least two antennas or antenna ports.

Herein, "layer" may refer to a spatial stream. "Rank" may refer to the number of layers. The rank may be a feature of each of the at least two precoders. The one or more layers and/or the rank of a respective one of the at least two precoders may be a feature (e.g., controlled by the control information) of the respective one of the at least two subbands (e.g., by using in the transmission for each of the at least two subbands the respective one of the at least two precoders).

By being indicative of the at least two precoders for the at least two subbands, the control information may be (e.g., implicitly) indicative of the rank for the at least two subbands.

The at least two subbands may be contiguous in the frequency domain. Alternatively or in addition, the at least two subbands may correspond to resource block groups (RBGs).

The radio channel may correspond to a carrier bandwidth, a set of contiguous physical resource blocks (PRBs), and/or an (e.g., active) bandwidth part (BWP).

The control information may schedule the transmission of the data on the at least two subbands. The control information may further be indicative of radio resources (e.g., in the time domain) to be used for the transmission on the at least two subbands. The transmission may be simultaneous on the at least two subbands.

The control information may be a signal of a physical (PHY) layer or a medium access control (MAC) layer (e.g., of a protocol stack for the uplink channel or the sidelink channel). Preferably, the control information may be contained in the downlink control information (DCI) format 0. Alternatively or in addition, e.g. if the overhead gets to large, the control information may be contained in a combination of DCI and a physical downlink shared channel (PDSCH).

The method may further comprise a step of transmitting reference signals (RS, e.g., sounding RS), optionally in each of the at least two subbands. The control information may be indicative of the at least two precoders in response to and/or based on the transmitted reference signals.

The data may be transmitted (e.g., according to the first method aspect) in an uplink from the radio device to a network node of a radio access network (RAN). The control information may be received from a network node of a RAN. The control information may be a downlink control information (DCI). The radio channel may be a physical uplink shared channel (PUSCH).

The data may be transmitted from the radio device to the network node. The radio channel may be a direct radio channel between the radio device and the network node.

The network node to which the data is transmitted may be the network node from which the control information and/or the configuration information is received.

The network node may be or may comprise a serving cell of the radio device.

The data may be transmitted (e.g., according to the first method aspect) in a sidelink from the radio device to another radio device. The control information (e.g., according to the first method aspect) may be received from another radio device. The control information may be a sidelink control information (SCI). The radio channel may be a physical sidelink shared channel (PSSCH).

The data may be transmitted from the radio device to the other radio device. The radio channel may be a direct radio channel between the radio device and the other radio device.

Each of the at least two precoders (e.g., according to the first method aspect) may correspond to at least one of a transmission precoder matrix index (TPMI) and a rank.

Each of the at least two precoders may be represented by a TPMI and/or a rank. Alternatively or in addition, for each of the at least two precoders, the control information may be indicative of a TPMI and/or a rank.

The received control information (e.g., according to the first method aspect) may be indicative of a respective one of the at least two precoders for each of the at least two subbands. The data may be transmitted on the radio channel using for each of the at least two subbands a respective one of the at least two precoders according to the received control information.

For example, different precoders may be indicated for (i.e., assigned to) and/or used on different subbands.

The control information (e.g., according to the first method aspect) may be indicative, for each of the at least subbands, of at least one of a TPMI of one of the at least two precoders and a rank of one of the at least two precoders.

A TPMI that is indicated per subband (i.e., a respective TPMI for each of the at least two subbands) may also be referred to as subband TPMI. A rank that is indicated per subband (i.e., a respective rank for each of the at least two subbands) may also be referred to as subband rank.

The at least two precoders (e.g., according to the first method aspect) may be based on a codebook.

The (e.g., same) codebook may be stored or hardcoded at the radio device and the network node or at the radio device and the other radio device. Alternatively or in addition, the codebook may be defined (i.e., specified) by a technical standard, e.g., according to the 3GPP document TS 38.212, version 16.6.0.

Each of the at least two precoders (or each precoder in the codebook) may imply a rank. Alternatively or in addition, the codebook may comprise at least two precoders for each rank.

The radio channel (e.g., according to the first method aspect) may comprise N subbands, N being equal to or greater than two, and the control information may be indicative of M precoders, M being equal to or greater than two, and N being equal to or greater than M.

In other words, a granularity of the precoders may be equal to or coarser than the granularity defined by the subbands in the frequency domain.

The control information (e.g., according to the first method aspect) may be indicative of ranks of the at least two precoders. The control information may be indicative of a respective one of the ranks for each of the at least two subbands or for each of at least two groups of the subbands.

A rank that is indicated per subband (i.e., a respective one of the ranks for each of the at least two subbands) may also be referred to as subband rank.

The at least two groups of the subbands may be disjoint sets of the at least two subbands. For example, the at least two groups may be a partition of the at least two subbands. For example, the radio channel may comprise four subbands and two groups each comprising a pair of two of the four subbands.

Alternatively or in addition, each of the groups of subbands may comprise a plurality of subbands.

A rank that is indicated per group (i.e., a respective one of the ranks for each of the at least two groups of the subbands) may also be referred to as group-of-subbands rank.

The control information (e.g., according to the first method aspect) may be indicative of one rank of the at least two precoders for all of the at least two subbands.

The one rank for all of the at least two subbands may also be referred to as a wideband rank.

The control information (e.g., according to the first method aspect) may be indicative of M precoders and L ranks for the M precoders, M being equal to or greater than two and L being less than M.

In other words, a granularity of the rank may be coarser than a granularity of the precoders.

The control information (e.g., according to the first method aspect) may be indicative of a respective one of the at least two precoders for each of the at least two subbands. The respective one of the at least two precoders may be encoded in the control information relative to the rank applicable according to the control information for the respective one of the at least two subbands.

As a first example for the relative encoding of the precoders in the control information, the control information may be indicative of the respective one of the at least two precoders within a subset of the codebook, the subset fulfilling (e.g., being restricted to) the rank applicable according to the control information for the respective one of the at least two subbands (e.g., the group-of-subbands rank indicated by the control information for the respective one of groups of the subbands or the wideband rank).

As a second example for the relative encoding of the precoders in the control information, the control information may comprise a bit field that is indicative of the TPMI of the respective one of the at least two precoders (TPMI bit field) based on a mapping. The mapping may map the TPMI bit field to a subset of the codebook, the subset fulfilling (e.g., being restricted to) the rank applicable according to the control information for the respective one of the at least two subbands (e.g., the group-of-subbands rank indicated by the control information for the respective one of groups of the subbands or the wideband rank). In other words, the mapping may be a function of the rank applicable for the respective one of the at least two subbands.

Alternatively or in addition, there may be two ways to indicate rank and precoder. A first example uses separate rank and precoder fields (e.g., in DCI). A second example indicates rank and precoder for a first subband (e.g., in a group of subbands) and only a precoder for the rest of the subbands.

For example, a column of a specified table (e.g., the first column of below Table 1) may comprise a set of entries (e.g., 64 entries). If the configuration information is indicated for one of these entries, which correspond to L layers, the configuration information may for the remaining subbands indicate only the subset of entries that correspond to L layers (of course, it is possible to restrict further).

The control information (e.g., according to the first method aspect) may be indicative of a respective one of the at least two precoders for each of the at least two subbands. The indications for the at least two subbands may be jointly encoded in the control information.

The "indications" may collectively refer to the indication of the respective one of the at least two precoders for each of the at least two subbands.

The joined encoding of the indications for the at least two subbands (e.g., according to the first method aspect) may depend on at least one of the rank applicable according to the control information; the number of the at least two subbands of the radio channel; a maximum rank of the radio device; and a coherence capability of the radio device.

The joined encoding of the indications for the at least two subbands (e.g., according to the first method aspect) may comprise restricting a set of candidates for the precoder of a first subband of the at least two subbands depending on the precoder indicated by the control information for a second subband of the at least two subbands.

The first subband and the second subband may be neighboring subbands (e.g., in the frequency domain).

The method (e.g., according to the first method aspect) may further comprise the step of receiving configuration information indicative of the at least two subbands of the radio channel.

The configuration information may be received from the network node or from the other radio device.

The configuration information may be indicative of subbands in the radio channel, e.g., the active at least two subbands or the available subbands in the radio channel. The available subbands in the radio channel may comprise the active subbands and the inactive subbands in the radio channel.

Alternatively or in addition, the configuration information may be indicative of a number of subbands in the radio channel, e.g., the number of (e.g., active) at least two subbands or the number of available subbands in the radio channel. The number of available subbands (also: the total number of subbands) in the radio channel may be the sum of the number of active subbands and the number of inactive subbands.

The configuration information may be received from the network node of the RAN or from the other radio device.

The configuration information (e.g., according to the first method aspect) may be a radio resource control (RRC) signaling. The configuration information may be received from a network node serving the radio device.

The configuration information (e.g., according to the first method aspect) may be indicative of whether or not the radio device is to perform subband precoding on the radio channel. The receiving of the control information that is indicative of the at least two precoders for the at least two subbands and/or the transmitting of the data on the at least two subbands using the at least two precoders is performed responsive to the received configuration information being indicative of the subband precoding.

Alternatively or in addition, the radio device transmits at least one sounding reference signal (SRS) (e.g., to the network node or the other radio device) on each of the at least two subbands responsive to the received configuration information being indicative of the subband precoding.

The at least two precoders may comprise a phase precoder and an amplitude precoder.

The control information (e.g., according to the first method aspect) may be indicative, for each of the at least two subbands, of a phase precoder and an amplitude precoder.

The control information (e.g., according to the first method aspect) may be indicative of a phase precoder for each of the at least two subbands and of an amplitude precoder for all of the at least two subbands.

As to a second method aspect, a method of receiving data from a radio device on at least two subbands of a radio channel is provided. The method comprises the step of transmitting, to the radio device, control information indicative of at least two precoders for the at least two subbands of the radio channel. The method further comprises the step of receiving, from the radio device, the data on the at least two subbands.

The second method aspect may be implemented alone or in combination with any one of the claims in the list of claims.

The data may be received based on or using the at least two precoders or precoders that depend on the at least two precoders.

Optionally, the method may further comprise a step of receiving reference signals (RSs, e.g., sounding RSs or demodulation RSs) from the radio device. Alternatively or in addition, the method may further comprise a step of determining (e.g., computing) the at least two precoders (e.g., for each of the subbands) based on the received RSs (e.g., based on a channel state computed based on the received RSs), optionally according to a zero-forcing technique or by minimizing a mean square error. The channel state may be computed for each of the subbands of the radio channel.

The reception (e.g., according to the second method aspect) may be an uplink reception from the radio device at a network node of a radio access network (RAN). The control information may be transmitted from a network node of a RAN. The control information may be a downlink control information (DCI). The radio channel may be a physical uplink shared channel (PUSCH).

The reception (e.g., according to the second method aspect) may be a sidelink reception from the radio device at another radio device. The control information may be transmitted from another radio device. The control information may be a sidelink control information (SCI). The radio channel may be a physical sidelink shared channel (PSSCH).

The method (e.g., according to the second method aspect) may be performed by the network node or the other radio device.

The method (e.g., according to the second method aspect) may further comprise the step of transmitting configuration information indicative of the at least two subbands of the radio channel.

The second method aspect may further comprise any feature and/or any step disclosed in the context of the first method aspect, or a feature and/or step corresponding thereto, e.g., a receiver counterpart to a transmitter feature or step.

As to another aspect, a computer program product is provided. The computer program product comprises program code portions for performing any one of the steps of the first and/or second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a radio device for transmitting data on at least two subbands of a radio channel is provided. The radio device comprised memory operable to store instructions and processing circuitry operable to execute the instructions, such that the radio device is operable to receive control information indicative of at least two precoders for the at least two subbands of the radio channel. The radio device is further operable to transmit the data on the at least two subbands using the at least two precoders.

The radio device (e.g., according to the first device aspect) may be further operable to perform any of the steps of the first method aspect.

As to a further first device aspect, a radio device for transmitting data on at least two subbands of a radio channel is provided. The radio device is configured to receive control information indicative of at least two precoders for the at least two subbands of the radio channel. The radio device is further configured to transmit the data on the at least two subbands using the at least two precoders.

The radio device (e.g., according to the further first device aspect) may be further configured to perform any of the steps of the first method aspect.

As to a yet further first device aspect, a user equipment (UE) for transmitting data on at least two subbands of a radio channel is provided. The UE configured to communicate with a base station or with another UE functioning as a gateway, the UE comprising a radio interface and processing circuitry configured to receive control information indicative of at least two precoders for the at least two subbands of the radio channel. The processing circuitry is further configured to transmit the data on the at least two subbands using the at least two precoders.

The processing circuitry of the UE (e.g., according to the yet further first device aspect) may be further configured to execute any of the steps of the first method aspect.

As to a second device aspect, a network node for receiving data from a radio device on at least two subbands of a radio channel is provided. The network node comprises memory operable to store instructions and processing circuitry operable to execute the instructions, such that the network node is operable to transmit, to the radio device, control information indicative of at least two precoders for the at least two subbands of the radio channel. The network node is further operable to receive, from the radio device, the data on the at least two subbands.

The network node (e.g., according to the second device aspect) may be further operable to perform any one of the steps of the second method aspect.

As to a further second device aspect, a network node for receiving data from a radio device on at least two subbands of a radio channel is provided. The network node being configured to transmit, to the radio device, control information indicative of at least two precoders for the at least two subbands of the radio channel. The network node being further configured to receive, from the radio device, the data on the at least two subbands.

The network node (e.g., according to the second device aspect) may be further configured to perform any of the steps of the second method aspect.

As to a yet further second device aspect, a base station for receiving data from a radio device on at least two subbands of a radio channel is provided. The base station is configured to communicate with a user equipment (UE). The base station comprises a radio interface and processing circuitry configured to transmit, to the UE, control information indicative of at least two precoders for the at least two subbands of the radio channel. The base station comprises a (e.g., the) radio interface and processing circuitry further configured to receive, from the UE, the data on the at least two subbands.

The processing circuitry (e.g., according to the second device aspect) may be further configured to execute any of the steps of the second method aspect.

Without limitation, for example in a 3GPP implementation, any "radio device" may be a user equipment (UE). Any radio device may be a user equipment (UE), e.g., according to a 3GPP specification.

In any radio access technology (RAT), the technique may be implemented for UL and/or SL. The SL may be implemented using proximity services (ProSe), e.g. according to a 3GPP specification.

The radio device and the RAN may be wirelessly connected in an uplink (UL) and/or a downlink (DL) through a Uu interface. Alternatively or in addition, the SL may enable a direct radio communication between proximal radio devices, e.g., a remote radio device and a relay radio device, optionally using a PC5 interface. Services provided using the SL or the PC5 interface may be referred to as proximity services (ProSe). Any radio device (e.g., the remote radio device and/or the relay radio device and/or the further radio device) supporting a SL may be referred to as ProSe-enabled radio device.

The radio device and/or the network node and/or the other radio device and/or the RAN may form, or may be part of, a radio network, e.g., according to the Third Generation Partnership Project (3GPP) or according to the standard family IEEE 802.11 (Wi-Fi). The first method aspect and the second method aspect may be performed by one or more embodiments of the remote radio device and the network node (or the other radio device), respectively.

The RAN may comprise one or more network nodes (e.g., base stations). At least one or each of the network nodes may perform the second method aspect. Alternatively or in addition, the radio network may be a vehicular, ad hoc and/or mesh network comprising two or more radio devices, e.g., acting as the radio device and the other radio device (optionally as the remote radio device and/or the relay radio device).

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more network node (e.g., base stations).

The radio device may be wirelessly connected or connectable (e.g., according to a radio resource control, RRC, state or active mode) with at least one base station of the RAN.

The base station may encompass any station that is configured to provide radio access to any of the radio devices. The base stations may also be referred to as cell, beam, transmission and reception point (TRP), radio access node or access point (AP). The base station may provide a data link to a host computer providing the user data to the remote radio device or gathering user data from the remote radio device. Examples for the base stations may include a 3G base station or Node B (NB), 4G base station or eNodeB (eNB), a 5G base station or gNodeB (gNB), a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

As to a system aspect, a communication system including a host computer is provided. The host computer comprises a processing circuitry configured to provide user data (e.g., in response to the data to be transmitted in the first method aspect). The host computer further comprises a communication interface configured to forward the user data to a cellular network (e.g., the RAN and/or the base station) for transmission to a UE. A processing circuitry of the cellular network is configured to execute any one of the steps of the second method aspect. Alternatively or in addition, the UE comprises a radio interface and processing circuitry, which is configured to execute any one of the steps of the first method aspect.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer (e.g., according to the system aspect) may be configured to execute a host application, thereby providing the data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein:

FIGS. 11 and 12 show flowcharts for methods implemented in a communication system including a host computer, a base station or radio device functioning as a gateway and a user equipment.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
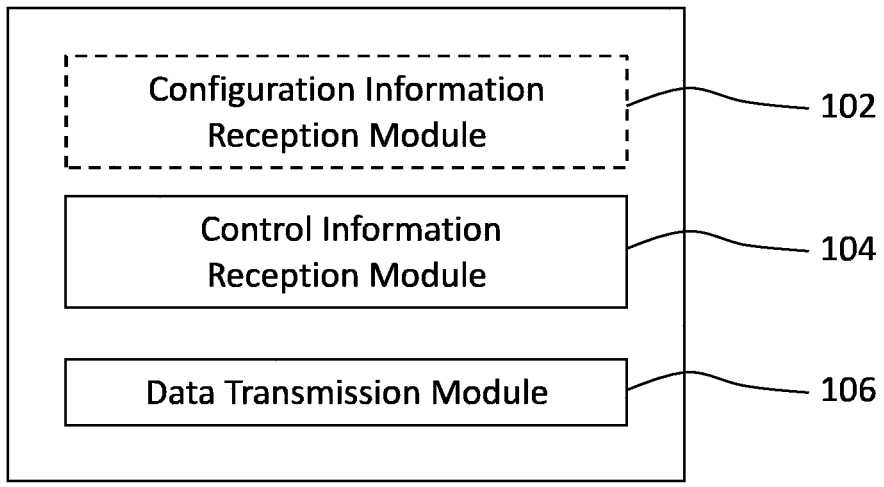
FIG. 1 shows a schematic block diagram of an embodiment of a device for transmitting data from a radio device on at least two subbands of a radio channel.

FIG. 1 schematically illustrates a block diagram of an embodiment of a device for transmitting data on at least two subbands of a radio channel. The device is generically referred to by reference sign 100.

The device 100 comprises a control information reception module 104 that receives control information indicative of at least two precoders for the at least two subbands of the radio channel. The device 100 further comprises a data transmission module 106 that transmits the data on the at least two subbands using the at least two precoders.

Optionally, the device 100 further comprises a configuration information module 102 that receives configuration information indicative of the at least two subbands.

Any of the modules of the device 100 may be implemented by units configured to provide the corresponding functionality.

The device 100 may also be referred to as, or may be embodied by, a transmitting station (or briefly: transmitter) and/or the radio device. The radio device 100 and a receiving station of the data transmission (e.g., a network node or another radio device) may be in direct radio communication, e.g., at least for the receiving of the control information and/or for the transmitting (e.g., in a multi-layer transmission) of the data from the radio device 100 to the receiving station. The receiving station may be embodied by the device 200.

Figure 2:
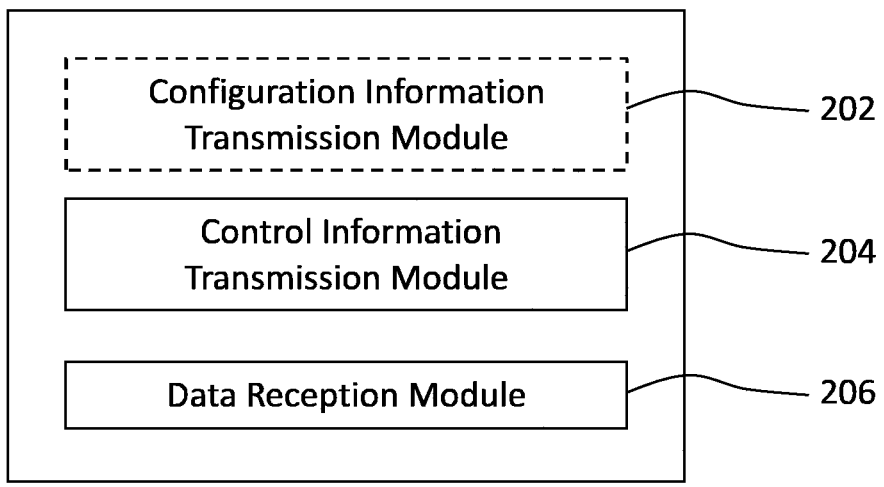
FIG. 2 shows a schematic block diagram of an embodiment of a device for receiving data from a radio device on at least two subbands of a radio channel.

FIG. 2 schematically illustrates a block diagram of an embodiment of a device for receiving data from a radio device on at least two subbands of a radio channel. The device is generically referred to by reference sign 200.

The device 200 comprises a control information transmission module 204 that transmits control information indicative of at least two precoders for the at least two subbands of the radio channel. The device 200 further comprises a data reception module 206 that receives the data on the at least two subbands (optionally based on or using the at least two precoders or precoders depending on the at least two precoders).

Optionally, the device 200 further comprises a configuration information transmission module 202 that transmits configuration information indicative of the at least two subbands.

Any of the modules of the device 200 may be implemented by units configured to provide the corresponding functionality.

The device 200 may also be referred to as, or may be embodied by, a receiving station (or briefly: receiver) and/or a network node and/or another radio device. The network node 200 and the radio device may be in direct radio communication, e.g., at least for the transmitting of the control information and/or for the receiving (e.g., in a multi-layer reception) of the data from the radio device at the network node 200. The radio device may be embodied by the device 100.

Figure 3:
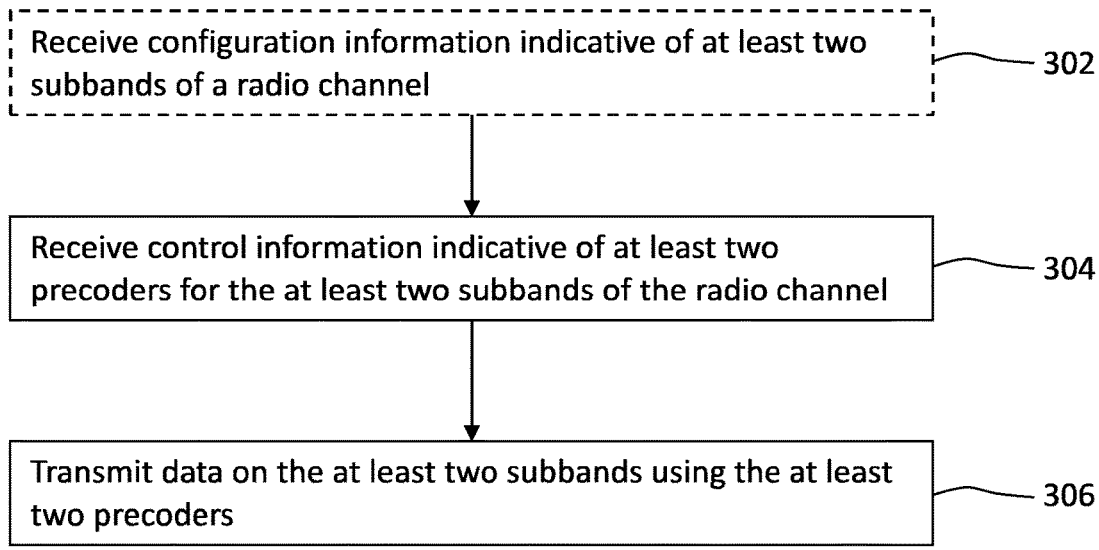
FIG. 3 shows a flowchart for a method of transmitting data from a radio device on at least two subbands of a radio channel, which method may be implementable by the device of FIG. 1.

FIG. 3 shows an example flowchart for a method 300 of transmitting data on at least two subbands of a radio channel. The method 300 is performed by a radio device. In a step 304 of the method 300, control information is received. The control information is indicative of at least two precoders for the at least two subbands of the radio channel. In a step 306 of the method 300, the data is transmitted on the at least two subbands using the at least two precoders.

Optionally, in a step 302 of the method 300, configuration information is received. The configuration information is indicative of the at least two subbands of the radio channel.

The method 300 may be performed by the device 100. For example, the modules 102, 104 and 106 may perform the steps 302, 304 and 306, respectively.

Figure 4:
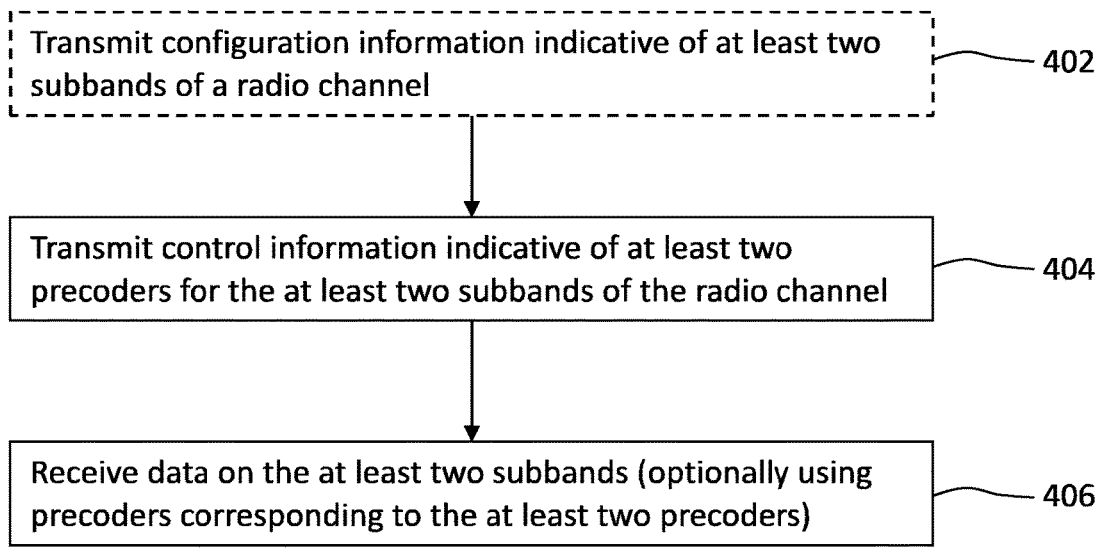
FIG. 4 shows a flowchart for a method of receiving data from a radio device on at least two subbands of a radio channel, which method may be implementable by the device of FIG. 2.

FIG. 4 shows an example flowchart for a method of receiving data from a radio device on at least two subbands of a radio channel. In a step 404 of the method 400, control information is transmitted to the radio device. The control information is indicative of at least two precoders for the at least two subbands of the radio channel. In a step 406 of the method 400, the data is received on the at least two subbands (optionally based on or using the at least two precoders or precoders depending on the at least two precoders).

Optionally, in a step 402 of the method 400, configuration information is transmitting (e.g., to the radio device). The configuration information is indicative of the at least two subbands of the radio channel.

The method 400 may be performed by the device 200. For example, the modules 202, 204 and 206 may perform the steps 402, 404 and 406, respectively.

In any aspect, the technique may be applied to uplink (UL), downlink (DL) or direct communications between radio devices, e.g., device-to-device (D2D) communications or sidelink (SL) communications.

Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Figure 5:
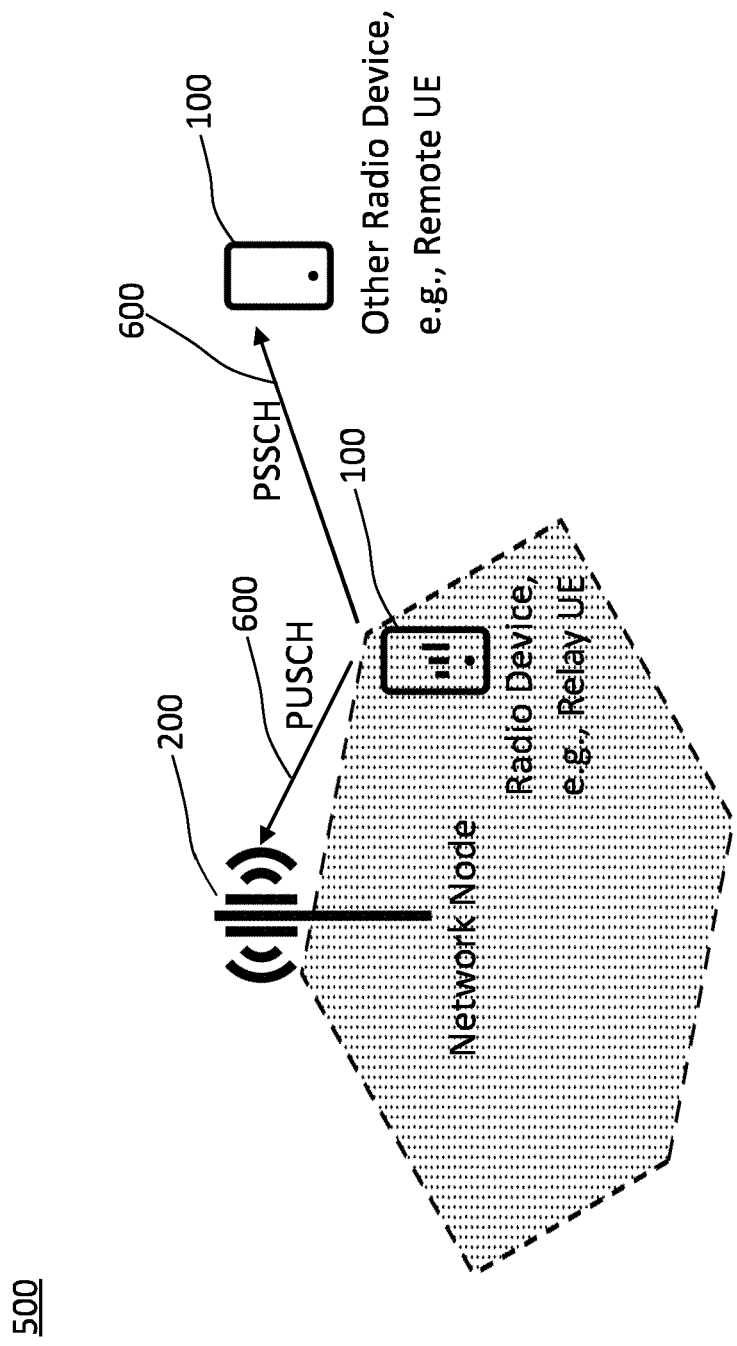
FIG. 5 schematically illustrates an example of a mobile communication system comprising embodiments of the devices of FIGS. 1 and 2.

FIG. 5 schematically illustrates an example of a mobile communication system 500 comprising embodiments of the radio device 100 and an embodiment of the network node 200.

The network node 200 may provide radio access to an embodiment of the radio device 100 in a cell of the network node 200. The radio channel 600 may comprise an uplink (UL), e.g., a PUSCH, between the radio device 100 and the network node 200.

Alternatively or in addition, the radio channel 600 may comprise or use a sidelink (SL) between the radio device 100 and another radio device (which may or may not be another embodiment of the device 100). For example, the radio channel is or comprises a PSSCH.

Figure 6:
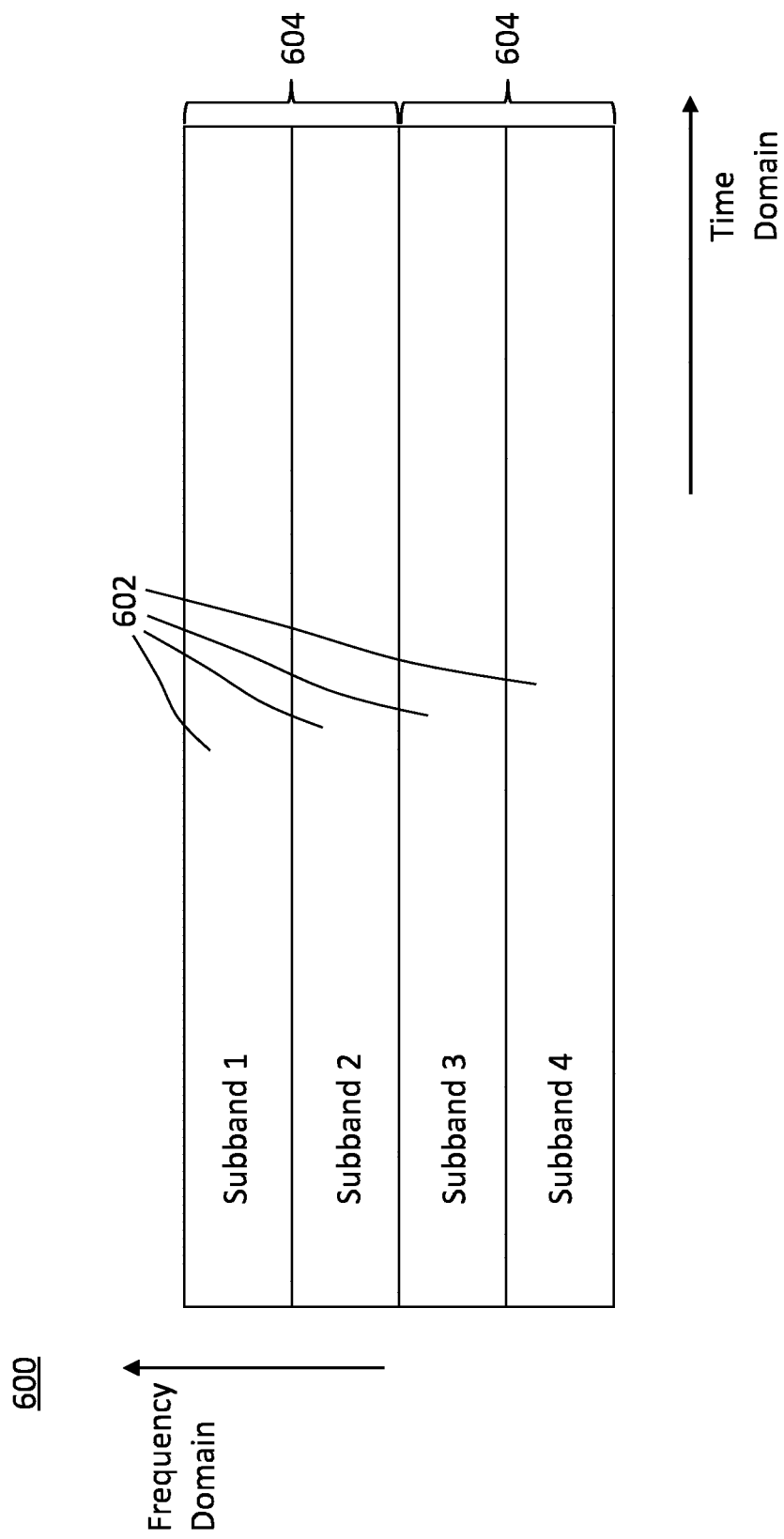
FIG. 6 schematically illustrates an example of a radio channel, which may be used by any one of the devices of FIGS. 1 and 2 for performing the method of FIGS. 3 and 4.

FIG. 6 schematically illustrates an example of the radio channel 600, which may be used by any embodiment of the radio device 100 and/or the network node 200 when performing the methods 300 and 400, respectively.

The radio channel comprises (e.g., is composed of) the at least two subbands 602 in the frequency domain. The subbands may be associated in groups 604. The subbands 602 or the groups 604 may persist in the time domain for a plurality of slots or transmission time intervals (TTIs).

Herein, any higher-layer parameter may be a parameter (e.g., a bit field) of the configuration information. Alternatively or in addition, the control information may comprise any PHY layer parameter or any dynamical parameter or any information for (e.g., dynamically) scheduling the transmitting 306 of the data.

In any embodiment (e.g., in any of the embodiments in the list of embodiments or in any of the detailed embodiments), the at least two precoders may be specified in a codebook (CB). Transmitting data using a precoder out of the codebook may also be referred to as CB-based precoding. Performing the transmitting 304 of the data using the at least two precoders (i.e., the subband precoding) may also be referred to as CB-based subband precoding.

In any embodiment, the CB-based subband precoding may be implemented by reusing or extending (e.g., in the configuration information of the steps 302 and 402 and/or in the control information of the steps 304 and 404) one or more parameters of an existing technique for CB-based precoding, e.g., of the existing technique for CB-based precoding on the PUSCH. Alternatively or in addition, any embodiment may reuse or extend or restrict the codebook of an existing technique for CB-based precoding, e.g., of the existing technique for CB-based precoding on the PUSCH. Accordingly, the existing technique for CB-based precoding on the PUSCH is described herein below (wherein the radio device 100 is referred to as a UE, the network node 200 is referred to as a gNB for brevity and not limitation, and the control information is referred to as DCI).

CB-based precoding on the PUSCH may be enabled if a higher-layer parameter txConfig is set to "codebook". For dynamically scheduled PUSCH with configured grant type 2, CB-based PUSCH transmission may comprise at least one of the following steps.

A first step comprises the UE 100 transmitting SRSs, which may be configured in an SRS resource set with higher-layer parameter usage in an information element (IE) SRS-Config set to "codebook". Up to two SRS resources (e.g. for testing up to two virtualizations and/or beams and/or panels of the antennas) each with up to four ports (e.g., antenna ports), can be configured in the SRS resource set.

A second step comprises the gNB 200 determining the number of layers (i.e., the rank) and a preferred precoder (i.e., TPMI) from a codebook subset based on the received SRS from one of the SRS resources. In any embodiment, the second step may be reused or extended by performing the second step for each subband.

The codebook subset may be configured via the higher-layer parameter codebookSubset, based on a UE capability of the UE 100 reported to the gNB 200, and/or may be one of: fully coherent (e.g., "fullyAndPartialAndNonCoherent"), partially coherent (e.g., "partialAndNonCoherent"), and non-coherent (e.g., "nonCoherent")

In a third step (e.g., in the step 404), if two SRS resources are configured in the SRS resource set, the gNB 200 indicates the selected SRS resource via a 1-bit SRI field in the DCI scheduling the PUSCH transmission 306. If only one SRS resource is configured in the SRS resource set, the SRI field is not indicated in DCI.

In a fourth step (e.g., in the step 404), the gNB 200 indicates, via DCI, the number of layers and the TPMI. One or more DM-RS ports associated with the one or more layers are also indicated in DCI.

In any embodiment, the subband precoding may be performed if transform precoding is not enabled (i.e., disabled). If transform precoding is enabled, the number of PUSCH layers may be limited to 1.

In the steps 304 and 404, the number of bits in DCI used for indicating the number of layers (i.e., the rank) and the TPMI (e.g., per subband in an embodiment) may be determined as follows (e.g., unless UL full-power transmission is configured, for which the number of bits may vary):

The size of the bit field for the rank and the TPMI may be 4, 5, or 6 bits, if the number of antenna ports is 4, if transform precoding is disabled, and if the higher-layer parameter maxRank in PUSCH-Config IE is set to 2, 3, or 4. In this case, the below Table 1 or the Table 7.3.1.1.2-2 of the 3GPP document TS 38.212, version 16.6.0 may be applied.

Alternatively or in addition, the size of the bit field for the rank and the TPMI may be 2, 4, or 5 bits, if the number of antenna ports is 4, if transform precoding is disabled or enabled, and if the higher-layer parameter maxRank in PUSCH-Config IE is set to 1. In this case, the below Table 2 or the Table 7.3.1.1.2-3 of the 3GPP document TS 38.212, version 16.6.0 may be applied may be applied.

Alternatively or in addition, the size of the bit field for the rank and the TPMI may be 2 or 4 bits, if the number of antenna ports is 2, if transform precoding is disabled, and if the higher-layer parameter maxRank in PUSCH-Config IE is set to 2. In this case the below Table 3 or the Table 7.3.1.1.2-4 of the 3GPP document TS 38.212, version 16.6.0 may be applied.

Alternatively or in addition, the size of the bit field for the rank and the TPMI may be 1 or 3 bits, if the number of antenna ports is 2, if transform precoding is disabled or enabled, and if the higher-layer parameter maxRank in PUSCH-Config IE is set to 1. In this case, the below Table 4 or the Table 7.3.1.1.2-5 of the 3GPP document TS 38.212, version 16.6.0 may be applied.

Alternatively or in addition, the size of the bit field for the rank and the TPMI may be 0 bits, if 1 antenna port is used for PUSCH transmission. In this case, no subband precoding may be performed.

In a fifth step (e.g., in the step 306), the UE 100 performs PUSCH transmission over the antenna ports corresponding to the SRS ports in the indicated SRS resource.

TABLE 1

(e.g., used for encoding precoding information and/or number of layers in the control information, optionally for 4 antenna ports, if transform precoder is disabled, and maxRank = 2, 3 or, 4)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layer: TPMI = 12 | | | | |
| ... | ... | | | | |
| 47 | 1 layer: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 2

(e.g., used for encoding in the control information precoding information and/or the number of layers, optionally for 4 antenna ports, if transform precoder is disabled/enabled and maxRank = 1)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layer: TPMI = 12 | 12-15 | reserved | | |
| ... | ... | | | | |
| 27 | 1 layer: TPMI = 27 | | | | |
| 28-31 | reserved | | | | |

TABLE 3

(e.g., used for encoding precoding information and/or the number of layers in the control information, optionally for 2 antenna ports, if transform precoder is disabled and maxRank = 2).

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 4

(e.g., used for encoding precoding information and/or the number of layers in the control information, optionally for 2 antenna ports, if transform precoder is disabled/enabled and maxRank = 1)

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

Embodiment of the technique may apply or modify any one of the above tables (i.e., the Table 1 to 4) for indicating at least one of the rank and the TPMI in the control information at a granularity that is finer than the entire bandwidth of the radio channel. In contrast, in legacy communication system using 5G NR as the RAT, the rank and the TPMI are valid only for UL wideband precoding (i.e., the same rank and precoder is applied over the entire scheduled PUSCH bandwidth).

Herein, the expression "subband" may encompass or refer to a part of the scheduled (wideband) PUSCH bandwidth. Alternatively or in addition, subband precoding according to the step 306 may refer to applying a different precoder for each of the subbands.

Embodiments enable (e.g., in accordance with release 18 or later of 3GPP NR) to support also subband UL precoding. In contrast, in legacy communication system using 5G NR as the RAT, only wideband UL precoding is supported. Same or further embodiments enable subband precoding in an overhead-efficient way, e.g., for CB-based PUSCH.

The control information (e.g., DCI) and/or the configuration information may define a framework and/or signaling for CB-based UL subband precoding. The TPMI (i.e., the PUSCH precoder) may be signaled per subband in the steps 304 and 404. Alternatively or in addition, the transmission rank (i.e., the number of PUSCH layers used in the step 306) may be signaled in the step 304 per subband, per groups of subbands, or wideband (i.e., the same for all subbands), which results in a tradeoff between signaling overhead and performance.

E.g. for CB-based UL subband precoding, a first group of embodiments signals in the steps 304 and 404 subband ranks and subband TPMIs, a second group of embodiment signals in the steps 304 and 404 group-of-subbands rank and subband TPMI, a third group of embodiments signals in the steps 304 and 404 a wideband rank and subband TPMIs.

In any of these embodiments, the configuration information in the steps 302 and 402 (e.g., RRC configuration) may be indicative of the total number of subbands (which may be a function of or equal to resource block group, RBG, size) and/or the number of active subbands.

E.g. for the second and third groups of embodiments, the signaling overhead (e.g., DCI overhead) may be reduced (optionally at the cost of potentially reduced performance). The reduction of the signaling overhead may be implemented in any one of the embodiments by at least one of the following steps.

A first step comprises mapping subband TPMI bitfields in the control information (e.g., the DCI) to a subset of the rank and TPMI bitfield in the codebook and/or in legacy NR. The mapping may be a function of the rank indicated in the control information, e.g., of the wideband rank and/or the per-subband-group (e.g., transmission) rank.

A second step comprises jointly encoding one or more TPMIs over all subbands. The jointly encoding may depend on, e.g., indicated wideband rank and/or per-subband-group (e.g., transmission) rank and/or the number of subbands and/or (e.g., existing) parameters. Examples of the existing parameters include a reported maximum rank of the radio device 100 (e.g., a UE max rank) and a coherence capability of the radio device 100.

Alternatively or in addition, in the jointly encoding, a set of candidate TPMIs in a certain subband 602 is restricted according to some rule. As an example of the rule, the set of candidate TPMIs in a subband n may depend on the TPMI (that is selected by the network node 200 and/or indicated by the configuration information) for another subband, e.g., the subband n-1 and/or optionally at least one of the subbands n-2, n-3, . . . .

Hereinbelow, detailed embodiments are described, e.g., showing how UL subband precoding could be supported for CB-based PUSCH transmission. The detailed embodiments can be implemented as described or as an extension of any of the above mentioned embodiments and the embodiments in the list of embodiments. Furthermore, the any of the below "one detailed embodiment" may be combined with each other, unless indicated otherwise as being "another detailed embodiment".

In one detailed embodiment, the at least two precoders to be used in the step 306 (e.g., the CB-based UL subband precoding) is RRC-configured in the steps 302 and 402 by an updated txConfig (called, e.g., txConfig-r18) field, which includes codebookSubset for configuring (e.g., activating or enabling) the method 300 or the subband precoding according to the steps 304 and 306 (e.g., the CB-based UL subband precoding). The configuration information (e.g., the bit field) may be comprised in an Information Element (IE) PUSCH-Config.

Below Abstract Syntax Notation One (ASN.1) gives an example of the configuration information (e.g., the bit field), which may be an extension of the 3GPP document TS 38.331, version 16.5.0. If txConfig-r18 is configured, the UE shall ignore the field txConfig.

-- ASN1START
-- TAG-PUSCH-CONFIG-START
PUSCH-Config ::=     SEQUENCE {
  ...,
  txConfig            ENUMERATED {codebook, nonCodebook}

-continued

```
OPTIONAL,   -- Need S
...,
[[
  ...,
  txConfig-r18          ENUMERATED {codebook, nonCodebook,
  codebookSubband}      OPTIONAL,    -- Need S
  ...,
]]
}
-- TAG-PUSCH-CONFIG-STOP
-- ASN1STOP
```

In one detailed embodiment, the (e.g., activating or enabling of) method 300 or the subband precoding according to the steps 304 and 306 (e.g., the CB-based UL subband precoding) is configured using an existing field (e.g., a legacy txConfig field) (set to codebook), and by RRC configuring a set of subbands in separate RRC fields (e.g., according to any of the below examples).

Alternatively or in addition, the control information in the steps 304 and 404 (e.g., the DCI carrying the information about the UL subband precoding) may be at least one of the following control information examples.

In a first control information example, a (e.g., new and/or dedicated) DCI format is used to schedule subband precoding on the PUSCH as the radio channel 600.

In a second control information example, an (e.g., old or existing) DCI format with a (e.g., new and/or dedicated) RNTI is used. The one or more fields (e.g., for the rand/or the TPMI) are repurposed to schedule subband precoding on the PUSCH as the radio channel 600.

In a third control information example, an (e.g., old or existing) DCI format is used to schedule wideband precoding on the PUSCH (e.g., DCI format 0_1 or 0_2). Selectively, one or more additional fields are included in the DCI format to indicated more than one precoder for the more than one subband 602.

Whether the one or more additional fields are included in the DCI may, for example, be based on the configuration information in the steps 302 and 402 (e.g., RRC configuration). For example, a (e.g., new or dedicated) parameter in the configuration information may enable subband precoding on the PUSCH, which may be configured in PUSCH-Config IE (e.g., as specified in the document 3GPP TS 38.331, version 16.5.0 or an extension thereof). If enabled, the one or more additional fields are included in the DCI.

For brevity, and without limitation thereto, the control information is referred to as DCI, the radio device 100 is referred to as UE 100, the network node 200 is referred to as gNB 200, and the radio channel is referred to as PUSCH. Furthermore, the methods 300 and 400 may be referred to as UL subband precoding or subband PUSCH precoding.

The following detailed embodiments may be related to the steps 304 and 404, e.g., for signaling one or more ranks and/or one or more TPMIs.

Optionally, the following detail embodiments may implement the first group of embodiments and/or may enable signaling (i.e., indicating) subband rank and/or subband TPMI by the network node 200 (e.g., without limitation a gNB) to the radio device 100 (e.g., without limitation a UE).

Herein, the one or more ranks used in the step 304 may also be referred to as transmission ranks.

Conventionally, e.g. in 3GPP NR, for wideband precoding on the PUSCH, the transmission rank and the TPMI are jointly encoded and indicated (i.e., signaled by the gNB 200 to the UE 100) with the same bitfield in DCI format 0_1 or 0_2 (e.g., according to any one of the above Tables 1 to 4).

In one detailed embodiment, the DCI used to schedule the transmission 306 using subband precoding on the PUSCH contains N identical bit fields. Each bit field may indicate the rank and the TPMI for one out of N subbands. This detailed embodiment can be useful in case one wants to enable independent rank and precoder per subband.

In one detailed embodiment, since the bit field used to indicate the rank and the TPMI in current NR UL codebooks varies depending on the configuration of the UE 100, for example based on maximum PUSCH rank and/or coherency (e.g., fully coherent, partially coherent or non-coherent codebook) of the UE 100, and/or since it is desirable to keep the signaling overhead of the DCI small, the UL subband precoding is only applicable for some RRC configurations (for example when maximum PUSCH rank is equal to 2 and/or the UE has signaled non-coherency).

In another detailed embodiment, instead of disabling UL subband precoding for some specific RRC configurations (e.g., due to too large bit fields for the rank and/or the TPMI), a codebook subset restriction may be applied, e.g. such that only a subset of all the rank and/or the TPMI codepoints can be selected, i.e., are selectable by means of the control information in the steps 304 and 404. This can reduce the size of the bit field for the rank and/or the TPMI.

The codebook subset restriction may be RRC-configured in the steps 302 and 402 or be pre-determined in a (e.g., extended 3GPP) technical specification. The codebook subset restriction may, for example, be used to select only a subset of all rank-and-TPMI indices from the coherent codebook.

In another detailed embodiment (e.g., instead of introducing codebook subset restrictions [e.g., to limit the size of the bit field for the rank and/or the TPMI for some RRC configurations] of current NR UL codebooks [e.g. according to any one of the Tables 1 to 4], one or more (e.g. new or dedicated) UL codebooks are specified (e.g. designed) that are used specifically and/or exclusively for UL subband precoding.

In one detailed embodiment, in case a (e.g., old or existing) DCI format (e.g., that currently can be used to schedule wideband PUSCH precoding, e.g., DCI format 0_1 or 0_2) is extended for subband PUSCH precoding, the (e.g., existing or legacy) bit field for the rank and the TPMI (e.g., according to the 3GPP document TS 38.212, version 16.6.0) may be used to indicate the rank and the TPMI for one (e.g., the first) subband 602 out of N subbands.

In this way, only N-1 (instead of N) additional bit fields for the rank and/or the TPMI are needed in the control information (e.g., in an updated DCI format).

In one detailed embodiment, for the case when the DCI indicates N precoder, e.g., contains N bit fields for the rank and the TPMI, and the PUSCH 600 is only scheduled over M<N subbands 602, the M first bit fields for rank and TPMI of the N bit fields for rank and TPMI in the DCI are used to indicate the rank and the TPMI for the M scheduled subbands. The remaining N-M subbands may be ignored by the UE 100.

The following detailed embodiments may relate to the third group of embodiments and/or when the configuration information is indicative of a wideband rank in combination subband TPMIs (i.e., signaled by the gNB 200 to the UE 100).

One way to reduce the DCI signaling overhead (optionally, at the cost of reduced performance in some scenarios)

is to use some wideband parameter settings, for example using the same rank over all subbands.

In one detailed embodiment, this is enabled by separating the rank and TPMI into separate bit fields. In this case, the gNB 200 may indicate (i.e., signal) to the UE 100, in the steps 302 and 402, one bit field for the rank (i.e., the wideband rank) that is valid for all subbands 602, and one bit field for the TPMI per subband (also referred to as TPMI-only DCI bit field). The TPMI-only DCI bit field may be significantly shorter, e.g. compared to the bit fields for the rank and the TPMI in legacy NR.

In one detailed embodiment, the size of the at least two TPMI-only DCI bitfields may dependent on (i.e., be a function of) the indicated wideband rank.

In one detailed embodiment, each of the TPMI-only DCI bit fields (i.e., the value, for example an index and/or a codepoint of the respective TPMI-only DCI bit field) is mapped to a value (e.g., index and/or codepoint) of a bit field that is indicative of both the rank and the TPMI (e.g., an existing or legacy bit field, optionally as in any one of the Tables 1 to 4). The mapping may use a pre-determined function or table.

Herein, a set of candidates for the precoder (e.g., the set of precoders or TPMIs) which can be indicated by the control information (e.g., the DCI) for a certain subband 602 (or for a certain group 604 of the subbands) is also referred to as the candidate set of TPMIs or the set of candidate TPMIs.

In one detailed embodiment, the candidate set of TPMIs in subband n depends on one or more precoders or one or more TPMIs configured (i.e., indicated by the DCI) in another subband (e.g., in subband n-1, or subbands 0,1, ... , n-1). This detailed embodiment is another example of codebook subset restriction.

Alternatively or in addition, the candidate set of TPMIs may be reported by the UE 100 to the gNB 200, e.g., as a function of a relative arrangement of antennas at the UE 100 for the precoded transmission in the step 306 (i.e., the step 306 of transmitting the data using the precoders to control a radio signal at each of the antennas).

In one detailed embodiment, the cardinality of the candidate set of TPMIs in subband n depends on the total number of subbands of the radio channel and/or on a transmission rank in the step 306 and/or on signaled (e.g., reported) UE capabilities of the UE 100.

To exemplify a potential reduction in the signaling overhead (e.g., in the steps 304 and 404), the first group of embodiments (e.g., indicating subband rank and subband TPMI in the DCI) is compared to the third group (e.g., indicating the wideband rank and subband TPMI in the DCI) for the following scenario: fully coherent UE, transform precoding is disabled, and the reported max rank is 2.

In this case, the leftmost column of Table 1 applies in legacy NR (and is assumed to apply also here), which is of length 6 bits. Furthermore, the number of subbands 602 may configured to be 10 and the wideband rank (i.e., the desired PUSCH rank is 2, for all subbands 602).

The following may be observed:
1. The DCI overhead for wideband (legacy) rank and TPMI signaling is 6 bits (see leftmost column of Table 1 and note that $\log_2(64)=6$).
2. The DCI overhead for signaling subband rank and subband TPMI (i.e., rank and TPMI per subband) is 6 bits per subband×10 subbands=60 bits.
3. The DCI overhead for wideband rank and TPMI signaling is 2 bits for wideband rank+$\lceil\log_2(22^{10})\rceil$=45 bits for subband TPMI=47 bits, wherein is may be assumed that:
   The wideband transmission rank could one of 1, 2, 3, 4 (4 values, i.e., 2 bits). If the max rank is 2, it would be possible to reduce this to only one bit.
   The subband TPMI bitfield jointly encode all 10 subbands. Note that there are 22 codepoints (i.e., 4-9, 20-27, and 48-55) in the leftmost column Table 1 that holds for rank-2 transmission.
4. The DCI overhead can be significantly reduced by codebook subset restriction. For example, assume that any of the 22 TPMIs can be configured in subband 0, but that the set of candidate TPMIs in subband n depends on the TPMI in subband n-1.
   For example, it may be assumed that the cardinality of the candidate set of TPMIs in subband n is 3 (e.g., one option is to use same TPMI as in subband n-1 and two options that are selected/specified according to some optimization criterion, e.g., for maximizing diversity or being "similar" (e.g., minimizing the $\mathcal{L}_p$-norm, where $p\in\{1,2,\infty\}$) to the TPMI in subband n-1). In this case, the DCI overhead for wideband rank and TPMI signaling is 2 bits for wideband rank+$\lceil\log_2(22\times3^9)\rceil$=19 bits for subband TPMI=21 bits.

In one detailed embodiment, in case an old DCI format used to schedule wideband PUSCH precoding (e.g., DCI format 0_1 or 0_2) are extended for subband PUSCH precoding, the current rank and TPMI bit field according to the 3GPP document 38.212, version 16.6.0 may be used to indicate the rank that should be used for all subbands (i.e., a wideband rank) and the TPMI for one out of N subbands (for example for the first subband).

The below detailed embodiments may relate to the second group of embodiments and/or the case when per-group-of-subbands rank and per-subband TPMI are signaled (i.e., indicated in the DCI) by the gNB 200 to the UE 100.

In one detailed embodiment, the scheduled subbands 602 can be grouped into several subsets and independent rank can be signaled for each group 604 of subbands 602.

For example, N scheduled subbands 602 may be grouped into G subband groups 604. The gNB 200 signals (i.e., indicates using the DCI in the step 404) to the UE 100 the rank and the TPMI for the first subband 602 in a subband group, which is used to deduce (i.e., determine or decode) the rank for all subbands 602 in the group 604 and the TPMI for the first subband 602.

Subsequently (e.g., within the same DCI or a further DCI), only the TPMIs for each of the rest subbands (i.e. the further subbands) in the subband group 604 is signaled from a subset of all rank-and-TPMI codepoints based on the rank deduced for the subband group.

This can reduce the size of the bit field for the rank and the TPMI, e.g., independently for each subband group 604.

In one detailed embodiment, the number of subband groups 604 can be configured from 1 up to $\lfloor N/2 \rfloor$, wherein the first (G−1) subband groups contain $\lfloor N/G \rfloor$, subbands and the last subband group contains N−$\lfloor N/G \rfloor$(G−1) subbands.

Note that the signaling overhead of the DCI for the second group of embodiments can be less than (or, equal, in case G=1) for the first group of embodiments and/or more than for the third group of embodiments, e.g. with the opposite being true for the expected performance.

Any embodiment of the first group may be used for co-phasing between subbands 602.

Alternatively or in addition, in any embodiment, the control information may be received in the step 304 (or transmitted in the step 404) partly on the PDCCH and partly on the physical downlink shared channel (PDSCH).

The following detailed embodiments may use a DCI for signaling wideband parameters, e.g. in the steps 304 and 404, and/or a separate channel to signal subband parameters of the subbands 602, e.g., in the steps 302 and 402.

The signaling of subband TPMIs (e.g., when high-resolution subband precoding is enabled) can introduce large signaling overhead of the DCI. If TPMI is solely conveyed via PDCCH, a large PDCCH size is required which may not be feasible. Considering this, DCI field that contains the TPMI information can be segmented into multiple parts and at least part of it can be conveyed via PDSCH.

In one detailed embodiment, the control information (e.g., a DCI field) that contains TPMI is segmented into two parts, where a part of the TPMI is carried by PDCCH, while the remaining part is carried by PDSCH. In one variant of this detailed embodiment, the complete TPMI can be segmented into a wideband part and a subband part. The wideband part may be conveyed (i.e., received in the step 304 and/or transmitted in the step 404) via PDCCH, while the subband part (e.g., which may be payload-heavy) is conveyed via PDSCH.

Note that the above segmentation is just one example, other ways of segmentation are not precluded. For example, the complete TPMI can be divided into a layer-common part and a layer-specific part.

Below detailed embodiments may relate to a size of the subbands 602 (or briefly: subband size) and/or may be combined with any other embodiment to implement the configuration information and/or the steps 302 and 402. For example, any of the below parameters in the Examples 1 to 5 may be included in the configuration information.

For PUSCH frequency allocation Type 0, the frequency-domain resource allocation field in an UL DCI comprises (or consist of) a bitmap, where each bit indicates if an RBG should be used for PUSCH transmission or not. The size of the RBG (in resource blocks) may be based on a bandwidth part (BWP) size and RRC configuration as specified in below Table 5 or the Table 6.1.2.2.1-1 in the 3GPP document TS 38.214, version 16.6.0.

TABLE 5

| Bandwidth Part Size | Nominal RBG size P | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

For PUSCH frequency allocation Type 1, the frequency-domain resource allocation field in an UL DCI (i.e., a DCI scheduling the transmission 304) may be defined by two parameters "RB_Start" and "Number_of_Consecutive_RBs" within a specific BWP. The "RB_Start" and "Number_of_Consecutive_RBs" within the BWP may be combined into a specific single value called Resource Indicator Value (RIV).

In one detailed embodiment, the subband size for PUSCH subband precoding is identical to the RBG size.

In one detailed embodiment, the actual subband size for PUSCH subband precoding varies with the scheduled PUSCH bandwidth. In this case a maximum subband size can be configured (for example by configuring a new parameter in PUSCH-Config or re-using the RBG size), and depending on the scheduled PUSCH bandwidth, the subband size is equal to or smaller than the "maximum subband size". For example, assume that the "maximum subband size" is equal to one RBG, the UL BWP consists of N RBGs and that the UL DCI therefore consists of N rank and TPMI bitfields (which are used to indicate TPMI and/or rank per subband). In case the UE is scheduled with PUSCH over the full BWP (i.e., over all N RBGs), then the subband size is equal to one RBG. However, assume that the UE is scheduled with PUSCH over half the BWP (i.e., over N/2 RBGs), since we still have N rank and/or TPMI bitfields in the DCI that we can utilize, we can reduce the subband size to half to RBG size. In this way, a finer granularity of the frequency-selective precoding may be achieved, e.g. when the scheduled PUSCH bandwidth is reduced (without any extra overhead in the signaling).

In one variant of this detailed embodiment, the subband size S (e.g., in resource blocks) can only be an integer value, for example according to the following equation:

$$S = \mathrm{ceil}(R \cdot M/N),$$

wherein M is the number of RBGs that is scheduled for PUSCH, N is the total number of RBGs in the BWP, and R is the RBG size.

In one detailed embodiment, a (e.g., new or dedicated) parameter is RRC configured, for example in PUSCH-Config IE (see 3GPP TS 38.331), that enables subband precoding and/or defines the subband size for the UL precoding.

In one variant of this detailed embodiment, e.g., as schematically exemplified in below Example 1 using ANS1, a (e.g., new or dedicated) parameter, here referred to as Ul-codebook-ReportingBand, comprises (or consists of) several different bit strings, e.g., in a similar way as the parameter csi-ReportingBand which is configured in CSI-ReportConfig IE as specified in the 3GPP document TS 38.331, version 16.5.0, is used to determine the subbands used for CSI reporting.

The parameter Ul-codebook-ReportingBand is used to indicate a contiguous or non-contiguous subset of subbands in the UL bandwidth part which rank and/or TPMI shall be reported to the UE for. Each bit in the bit-string represents one subband. The choice determines the number of subbands (subbands3 for 3 subbands, subbands4 for 4 subbands, and so on).

EXAMPLE 1

```
-- ASN1START
-- TAG-PUSCH-CONFIG-START
PUSCH-Config ::=            SEQUENCE {
  Ul_codebook-ReportingBand   CHOICE {
    subbands3                   BIT STRING(SIZE(3)),
    subbands4                   BIT STRING(SIZE(4)),
    subbands5                   BIT STRING(SIZE(5)),
    subbands6                   BIT STRING(SIZE(6)),
    subbands7                   BIT STRING(SIZE(7)),
    subbands8                   BIT STRING(SIZE(8)),
    subbands9                   BIT STRING(SIZE(9)),
    subbands10                  BIT STRING(SIZE(10))
    subbands11                  BIT STRING(SIZE(11))
    subbands12                  BIT STRING(SIZE(12))
```

```
    subbands13            BIT STRING(SIZE(13))
    subbands14            BIT STRING(SIZE(14))
    subbands15            BIT STRING(SIZE(15))
    subbands16            BIT STRING(SIZE(16))
    subbands17            BIT STRING(SIZE(17))
    subbands18            BIT STRING(SIZE(18))
}
-- TAG-PUSCH-CONFIG-STOP
-- ASN1STOP
```

In one variant of this detailed embodiment, e.g., as schematically exemplified in below Example 2 using ANS1, a (e.g., new or dedicated) parameter, here referred to as Ul-codebook-subband-size, is used to indicate the subband size for which rank and/or TPMI shall be reported to the UE 100 for. The subband size can for example be given in number of resource blocks (RBs) or number of RBGs.

If the parameter is configured, the step 306 (i.e., PUSCH subband precoding) is enabled with the indicated subband size. Alternatively or in addition, if the parameter is not configured, wideband UL precoding is applied. The number of actual subbands 602 for the scheduled PUSCH transmission 306 may in this case depend on the scheduled PUSCH bandwidth. E.g., the smaller PUSCH scheduling bandwidth the fewer subbands, since the subband size is assumed to be fixed in size).

EXAMPLE 2

```
-- ASN1START
-- TAG-PUSCH-CONFIG-START
PUSCH-Config ::=   SEQUENCE {
Ul-codebook-subband-size   ENUMERATE{1,2,4,8}
}
-- TAG-PUSCH-CONFIG-STOP
-- ASN1STOP
```

In one variant of this detailed embodiment, e.g., as schematically exemplified in below Example 3 using ANS1, a (e.g., new or dedicated) parameter, here referred to as Ul-codebook-NumberOfSubbands, is used to indicate the number of subbands 602 for which rank and/or TPMI shall be reported (e.g., configured in the step 302) to the UE 100. The subband size may in this case vary depending on scheduled PUSCH bandwidth.

For example, in case the UL bandwidth part (BWP) comprises (or consist of) 24 RBs, and the number of subbands is configured to 3, the subband size may be 24/3=8 RBs. If the parameter is configured, the step 306 (i.e., PUSCH subband precoding) is enabled with the indicated number of subbands. If the parameter is not configured, wideband UL precoding is applied.

In this example, the number of subbands may be configured from 2 up to N, however, it is possible that for example only even number of subbands are supported. That is, the parameter may be configured to one out of: 2,4,6, . . . , N.

EXAMPLE 3

```
-- ASN1START
-- TAG-PUSCH-CONFIG-START
PUSCH-Config ::=   SEQUENCE {
Ul-codebook-NumberOfSubbands
```

```
      ENUMERATED{2,3,4,5,6,7,8,9,... N}
}
-- TAG-PUSCH-CONFIG-STOP
-- ASN1STOP
```

In one variant of this detailed embodiment, e.g., as schematically exemplified in below Example 4 using ANS1, a (new or dedicated) parameter, here referred to as Ul-codebook-subbandPrecoding, is used to indicate whether the method 300 or at least the step 306 (i.e., PUSCH subband precoding) is enabled or not.

In this case, the subband size may be pre-configured in a technical specification (e.g., according to 3GPP) and/or based on other RRC-configured parameters (e.g., received in the step 302). In one example, the subband size is assumed to be the same as the RBG size. If the parameter is configured, PUSCH subband precoding is enabled, and if the parameter is not configured, wideband UL precoding is applied.

EXAMPLE 4

```
-- ASN1START
-- TAG-PUSCH-CONFIG-START
PUSCH-Config ::=   SEQUENCE {
Ul-codebook-subbandPrecoding   ENUMERATED{enabled}
}
-- TAG-PUSCH-CONFIG-STOP
-- ASN1STOP
```

In any embodiment of the second group of embodiments and/or if the subbands 602 are grouped into G subband groups 604, a (e.g., new or dedicated) parameter, here referred to as Ul-codebook-NumberOfSubbandGroups, is used to indicate the number of subbands 602 in a group 604 (e.g., for which the rank may be determined independently), e.g., as schematically exemplified in below Example 5 using ANS1.

If the parameter Ul-codebook-NumberOfSubbandGroups is configured, subband group size is set with the indicated number of subbands 602. If the parameter is not configured, the bit field for the rank and the TPMI is only reported for the first subband (i.e., a wideband rank).

EXAMPLE 5

```
-- ASN1START
-- TAG-PUSCH-CONFIG-START
PUSCH-Config ::=   SEQUENCE {
Ul-codebook-NumberOfSubbandGroups   ENUMERATED{1,2,3,..., floor
{N/2)}
-- TAG-PUSCH-CONFIG-STOP
-- ASN1STOP
```

Moreover, in any embodiment, each of the at least two precoders may be (e.g., according to current NR UL codebooks) a constant modulus precoder. E.g., the each of the TPMI may correspond to a constant modulus precoder. Optionally, any embodiment may be extended to include non-constant modulus TPMIs (i.e., precoders), e.g., to enable both phase and amplitude precoding.

In one variant thereof, the control information is indicative of both phase and amplitude precoders per subband 602 in the steps 304 and 404.

In another variant thereof, one amplitude precoder is indicated for all subbands (i.e., wideband) and the phase precoders are indicated per subband in the steps 304 and 404.

Figure 7:
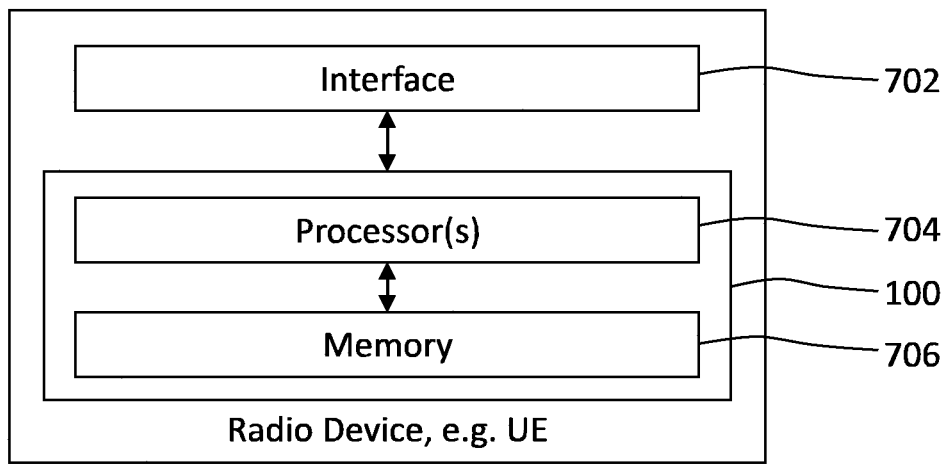
FIG. 7 shows a schematic block diagram of a radio device embodying the device of FIG. 1.

FIG. 7 shows a schematic block diagram for an embodiment of the device 100. The device 100 comprises processing circuitry, e.g., one or more processors 704 for performing the method 300 and memory 706 coupled to the processors 704. For example, the memory 706 may be encoded with instructions that implement at least one of the modules 102, 104 and 106.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 706, transmitter functionality and/or radio device functionality. For example, the one or more processors 704 may execute instructions stored in the memory 706. Such functionality may include providing various features and steps discussed herein, including any of the benefits disclosed herein. The expression "the device being operative to perform an action" may denote the device 100 being configured to perform the action.

As schematically illustrated in FIG. 7, the device 100 may be embodied by a radio device 700, e.g., functioning as a transmitting UE. The radio device 700 comprises a radio interface 702 coupled to the device 100 for radio communication with one or more receiving stations, e.g., functioning as a receiving network node (e.g., base station) or a receiving radio device (e.g., the other radio device).

Figure 8:
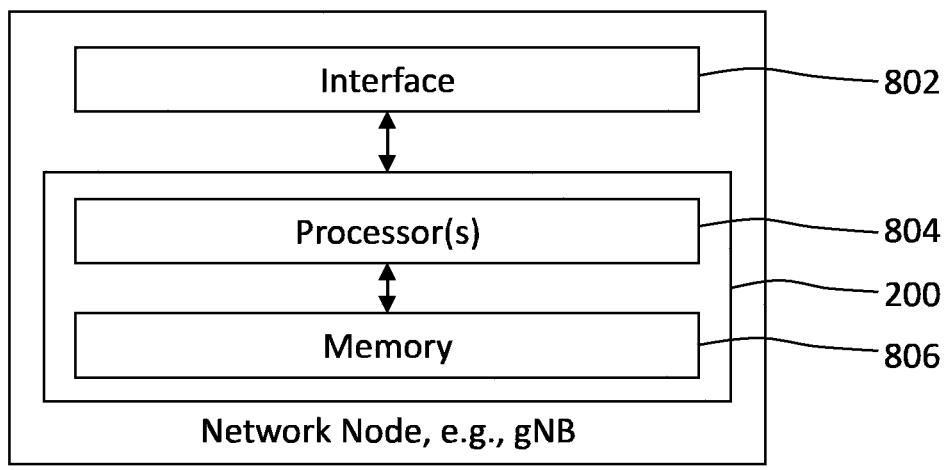
FIG. 8 shows a schematic block diagram of a network node embodying the device of FIG. 2.

FIG. 8 shows a schematic block diagram for an embodiment of the device 200. The device 200 comprises processing circuitry, e.g., one or more processors 804 for performing the method 400 and memory 806 coupled to the processors 804. For example, the memory 806 may be encoded with instructions that implement at least one of the modules 202, 204 and 206.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 806, receiver functionality and/or network node functionality. For example, the one or more processors 804 may execute instructions stored in the memory 806. Such functionality may include providing various features and steps discussed herein, including any of the benefits disclosed herein. The expression "the device being operative to perform an action" may denote the device 200 being configured to perform the action.

As schematically illustrated in FIG. 8, the device 200 may be embodied by a network node 800, e.g., functioning as a receiving base station or a receiving UE. The network node 800 comprises a radio interface 802 coupled to the device 200 for radio communication with one or more radio devices, e.g., functioning as a transmitting radio device (e.g., UE).

Figure 9:
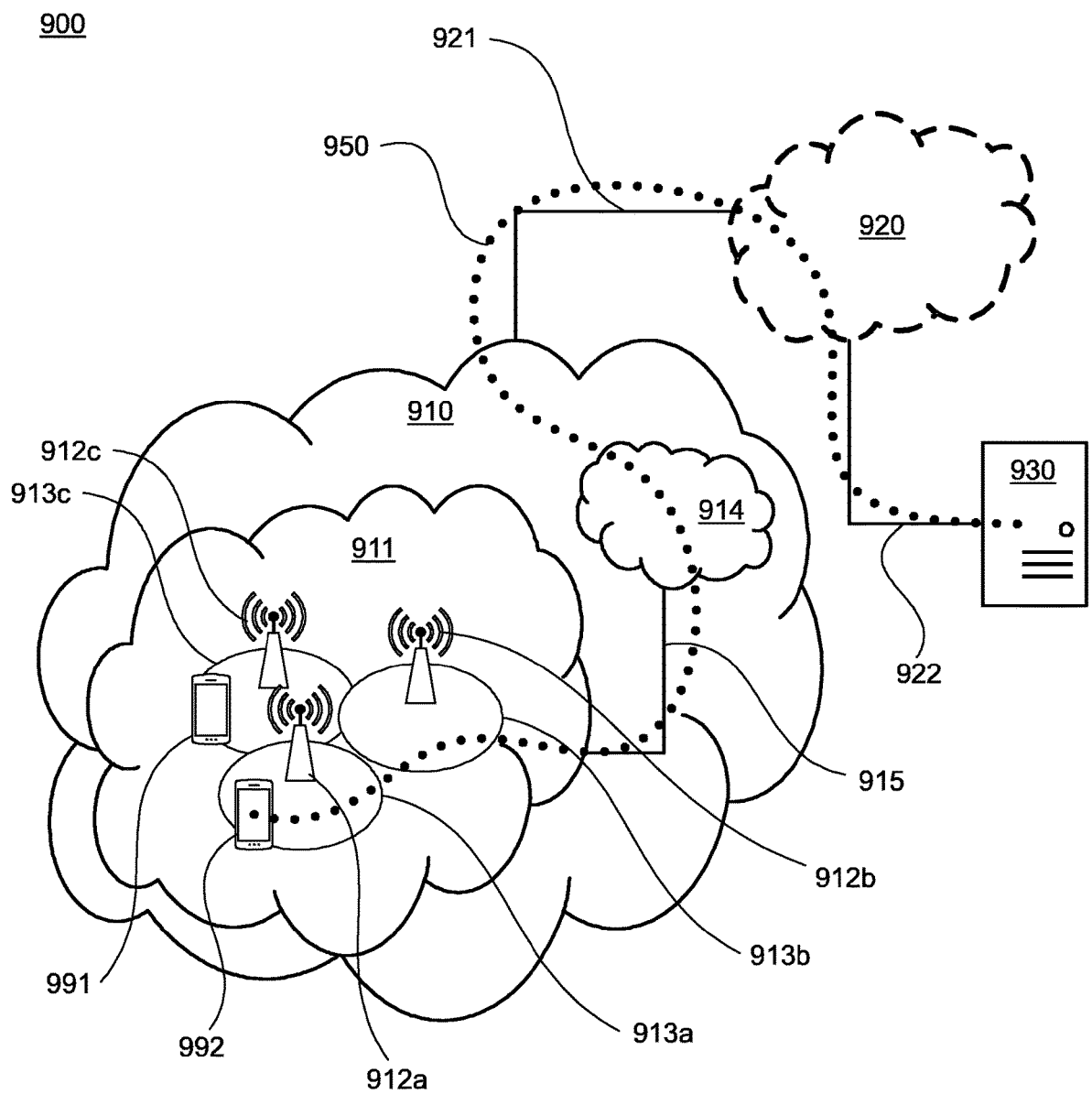
FIG. 9 schematically illustrates an example telecommunication network connected via an intermediate network to a host computer.

With reference to FIG. 9, in accordance with an embodiment, a communication system 900 includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Any of the base stations 912 and the UEs 991, 992 may embody the device 100.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system 900 of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

By virtue of the method 300 being performed by any one of the UEs 991 or 992 (as examples of the radio device 100) and/or the method 400 being performed by any one of the base stations 912 (as examples of the network node 200), the performance or range of the OTT connection 950 can be improved, e.g., in terms of increased throughput (e.g., due to an increase in spectra efficiency and/or a reduction in signaling overhead). More specifically, the host computer 930 may indicate to the RAN 910 or the network node 200 or the other radio device 200 or the radio device 100 (e.g., on an application layer, and/or expressly or implicitly) when to apply the technique, i.e., when to perform subband precoding for the data.

Example implementations, in accordance with an embodiment of the UE, base station and host computer discussed in the preceding paragraphs, will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data, which is transmitted using the OTT connection 1050. The user data may depend on the location of the UE 1030. The user data may comprise auxiliary information or precision advertisements (also: ads) delivered to the UE 1030. The location may be reported by the UE 1030 to the host computer, e.g., using the OTT connection 1050, and/or by the base station 1020, e.g., using a connection 1060.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct, or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
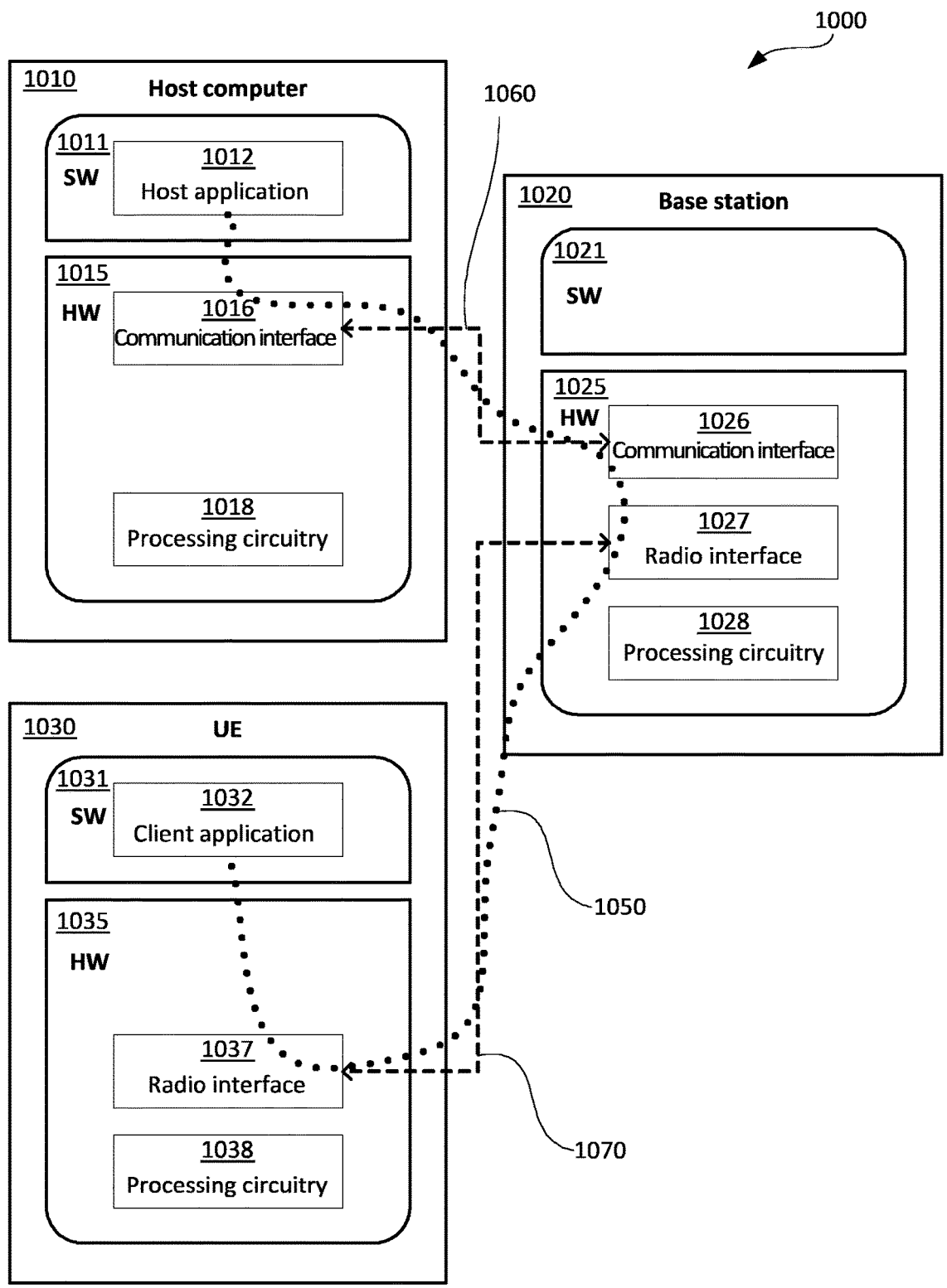
FIG. 10 shows a generalized block diagram of a host computer communicating via a base station or radio device functioning as a gateway with a user equipment over a partially wireless connection.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10, and, independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or "dummy" messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this paragraph. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this paragraph. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

As has become apparent from above description, at least some embodiments of the technique enable CB-based UL subband precoding (e.g., for NR), which can enhance the UL spectral efficiency. Same of further embodiments can enabled an overhead-efficient way for subband precoding, which can further enhance the UL spectral efficiency.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data on at least two subbands of a radio channel, the method being performed by a radio device and comprising the steps of:
receiving control information indicative of at least two precoders for the at least two subbands of the radio channel, wherein respective indications for the at least two precoders for the at least two subbands are jointly encoded in the control information, wherein the jointly encoded indications for the at least two subbands restrict a set of candidates for the precoder of a first subband of the at least two subbands depending on the precoder indicated by the control information for a second subband of the at least two subbands; and
transmitting the data on the at least two subbands using the at least two precoders.

2. The method of claim 1, wherein the jointly encoded indications for the at least two subbands depends on a rank applicable according to the control information.

3. The method of claim 2, wherein the jointly encoded indications for the at least two subbands depends on a number of the at least two subbands of the radio channel.

4. The method of claim 2, wherein the jointly encoded indications for the at least two subbands depends on a maximum rank of the radio device.

5. The method of claim 2, wherein the jointly encoded indications for the at least two subbands depends on a coherence capability of the radio device.

6. The method of claim 1, wherein:
the data is transmitted in an uplink from the radio device to a network node of a radio access network, RAN; and/or
the control information is received from a network node of a RAN; and/or
the control information is a downlink control information, DCI; and/or
the radio channel (600) is a physical uplink shared channel, PUSCH.

7. The method of claim 1, wherein the data is transmitted on the radio channel using, for each of the at least two subbands, the respective one of the at least two precoders according to the received control information.

8. The method of claim 1, wherein the control information is indicative of one rank of the at least two precoders for all of the at least two subbands.

9. The method of claim 1, wherein the control information is indicative of M precoders and L ranks for the M precoders, M being equal to or greater than two and L being less than M.

10. The method of claim 8, wherein the control information is indicative of a respective one of the at least two precoders for each of the at least two subbands, wherein the respective one of the at least two precoders is encoded in the control information relative to the rank applicable according to the control information for the respective one of the at least two subbands.

11. The method of claim 1, further comprising the step of:
receiving configuration information indicative of the at least two subbands of the radio channel, wherein the configuration information is a radio resource control, RRC, signaling; and/or
wherein the configuration information is received (302) from a network node serving the radio device.

12. The method of claim 11, wherein the configuration information is indicative of whether or not the radio device is to perform subband precoding on the radio channel, and wherein the receiving of the control information that is indicative of the at least two precoders for the at least two subbands and/or the transmitting of the data on the at least two subbands using the at least two precoders is performed responsive to the received configuration information being indicative of the subband precoding.

13. A method of receiving data from a radio device on at least two subbands of a radio channel, the method wherein being performed by a network node and comprising the steps of:

transmitting, to the radio device, control information indicative of at least two precoders for the at least two subbands of the radio channel, wherein respective indications for the at least two precoders for the at least two subbands are jointly encoded in the control information, wherein the jointly encoded indications for the at least two subbands restrict a set of candidates for the precoder of a first subband of the at least two subbands depending on the precoder indicated by the control information for a second subband of the at least two subbands; and receiving, from the radio device, the data on the at least two subbands.

14. The method of claim 13, wherein:
the reception is an uplink reception from the radio device at the network node of a radio access network, RAN; and/or
the control information is transmitted from the network node of a RAN; and/or
the control information is a downlink control information, DCI; and/or
the radio channel is a physical uplink shared channel, PUSCH.

15. The method of claim 13, further comprising the step of:
transmitting configuration information indicative of the at least two subbands of the radio channel.

16. A radio device for transmitting data on at least two subbands of a radio channel, the radio device comprising memory operable to store instructions and processing circuitry operable to execute the instructions, such that the radio device is operable to:

receive control information indicative of at least two precoders for the at least two subbands of the radio channel, wherein respective indications for the at least two precoders for the at least two subbands are jointly encoded in the control information, wherein the jointly encoded indications for the at least two subbands restrict a set of candidates for the precoder of a first subband of the at least two subbands depending on the precoder indicated by the control information for a second subband of the at least two subbands; and transmit the data on the at least two subbands using the at least two precoders.

17. A network node for receiving data from a radio device on at least two subbands of a radio channel, the network node comprising memory operable to store instructions and processing circuitry operable to execute the instructions, such that the network node is operable to:
transmit, to the radio device, control information indicative of at least two precoders for the at least two subbands of the radio channel, wherein respective indications for the at least two precoders for the at least two subbands are jointly encoded in the control information, wherein the jointly encoded indications for the at least two subbands restrict a set of candidates for the precoder of a first subband of the at least two subbands depending on the precoder indicated by the control information for a second subband of the at least two subbands; and
receive, from the radio device, the data on the at least two subbands.

* * * * *